United States Patent [19]

Hayward et al.

[11] 3,976,629

[45] Aug. 24, 1976

[54] PROCESS OF MANUFACTURING SPHERICAL POLYMERIC BEADS

[75] Inventors: Malcolm Edwin Hayward, East Doncaster; Volker Elmar Maier, Parkdale, both of Australia

[73] Assignees: ICI Australia Limited; Commonwealth Scientific and Industrial Research Organization, both of Melbourne, Australia

[22] Filed: Nov. 8, 1974

[21] Appl. No.: 522,295

[30] Foreign Application Priority Data
Nov. 21, 1973 Australia............................ 5724/73

[52] U.S. Cl. ............................ 526/227; 260/2.1 E; 260/29.6 H; 260/29.6 WQ; 428/407; 526/318; 526/329; 526/229; 526/295; 526/308; 526/335; 526/336; 526/332; 526/280
[51] Int. Cl.$^2$................ C08F 234/04; C08F 279/00; C08F 200/00; C08F 210/00
[58] Field of Search .............. 260/80 R, 80 M, 83.5, 260/2.1 E, 80 C, 82.1, 80.3, 88.1 PC, 87.5 R

[56] References Cited
UNITED STATES PATENTS

| | | | |
|---|---|---|---|
| 2,706,192 | 4/1955 | Hoag................................. | 260/80 M |
| 2,810,716 | 10/1957 | Markus............................ | 260/80 M |
| 3,211,708 | 10/1965 | Zimmerman et al............. | 260/80 M |

OTHER PUBLICATIONS
Schildnecht, C. E., *Polymer Processes*, vol. X, "Oxidation or Reduction by Single Electron Steps," p. 15, Intersci. Pub., N. Y., 1956.

*Primary Examiner*—Joseph L. Schofer
*Assistant Examiner*—Herbert J. Lilling
*Attorney, Agent, or Firm*—Cushman, Darby & Cushman

[57] ABSTRACT

A process of manufacturing approximately spherical polymeric beads of average size less than 20 microns, which process comprises copolymerizing an unsaturated carboxylic acid and a crosslinking agent characterized in that the polymerization is initiated by means of a two part redox free radical system and is carried out in a reaction mixture comprising a fine suspension of droplets of an organic phase in an aqueous phase wherein the organic phase comprises an acid chosen from the group consisting of methacrylic acid and crotonic acid; a crosslinking agent; and an oil soluble and water insoluble first part of a redox free radical initiated system; and wherein the aqueous phase comprises water, at least 15% weight inert salt per volume of aqueous phase, and a suspending agent; and the second part of the redox free radical initiator is at least partially soluble in both the organic and the aqueous phase and is added to the reaction mixture during the course of polymerization while the reaction mixture is maintained at a temperature in the range from 0°C to 50°C.

11 Claims, No Drawings

PROCESS OF MANUFACTURING SPHERICAL POLYMERIC BEADS

This invention relates to the manufacture of ion exchange resin beads, in particular it relates to the manufacture of approximately spherical beads of crosslinked polymers of certain unsaturated carboxylic acids.

The manufacture of crosslinked polymers of unsaturated carboxylic acids is well known in the art. Known methods include bulk polymerisation of acrylic or methacrylic acid with a suitable crosslinking co-mer such as divinyl benzene, and the so-called pearl polymerisation of esters of anhydrides of unsaturated carboxylic acids. However, in the prior art processes it is difficult to obtain microfine spherical particles; by microfine we mean particles having an average size less than 20 microns. Microfine ion exchange resins are of use in the manufacture of cosmetics, pharmaceutical preparations, foodstuffs and in ion exchange processes, such as, for example, the so-called "Sirotherm" process for the desalination of brackish water. (Sirotherm is a Trade Mark for ICI Australia's thermally regenerable ion exchange resins and apparatus for using these resins).

For use in Sirotherm, microfine resin particles must be substantially free from agglomeration. Generally, in the past, attempts to produce these microfine resins by suspension polymerisation technology have yielded large agglomerates of fine particles which agglomerates could only be separated into their primary particles by means such as grinding or milling.

Unsaturated carboxylic acids are very reactive and their polymerisation or copolymerisation is difficult to control. It is known in the art that the polymerisation of certain derivatives of unsaturated carboxylic acids is more easily controlled than the polymerisation of the unsaturated acids. However it is difficult to hydrolyze the protecting group from the resultant polymers and therefore such methods are difficult to use for the production of microfine particles comprising acidic groups. We have now found a process of manufacturing approximately spherical beads in a controlled size range and yielding particles which are either unagglomerated or agglomerated to only a minor extent.

Accordingly we provide a process of manufacturing approximately spherical polymeric beads of average size less than 20 microns, which process comprises copolymerising an unsaturated carboxylic acid and a crosslinking agent characterised in that the polymerisation is initiated by means of a two part redox free radical system and is carried out in a reaction mixture comprising a fine suspension of droplets of an organic phase in an aqueous phase wherein the organic phase comprises an acid chosen from the group consisting of methacrylic acid and crotonic acid; a crosslinking agent; and an oil soluble and water insoluble first part of a redox free radical initiator system; and wherein the aqueous phase comprises water, at least 15% weight inert salt per volume of aqueous phase, and a suspending agent; and the second part of the redox free radical initiator is at least partially soluble in both the organic and the aqueous phase and is added to the reaction mixture during the course of polymerisation while the reaction mixture is maintained at a temperature in the range from 0°C to 50°C.

The nature and concentration of the two part redox free radical initiator system is not narrowly critical except one part of the system must be substantially insoluble in the aqueous phase and soluble in the organic phase and the second part must be soluble in the aqueous phase and exhibit at least a small solubility in the organic phase. Suitable compositions for the first part of the redox systems are for example organic peroxides such as lauroyl peroxide, isobutyrl peroxide, di-cetyl peroxy-dicarbonate, cumene hydro peroxide, dicumyl peroxide, benzoyl peroxide, t-butyl peroxy pivalate. Suitable compounds for the second part of the redox system are for example $Fe^{++}$, $Ti^{+++}$, $Co^{++}$ suitably in the form of ferrous chloride, titanous chloride, and cobaltous chloride. These metal ions are freely soluble in water and are only sparingly soluble in the organic phase. However, solubility in the organic phase is sufficient to activate the initiator system.

The conditions of the process should be chosen so that the solubility of the unsaturated carboxylic acid in the aqueous phase is as low as possible as we believe that agglomeration of the product is largely due to polymerisation occurring in the aqueous phase.

The amount of unsaturated carboxylic acid dissolved in the aqueous phase may be reduced by one or more of the following expedients.

1. Addition of inert salt
2. Addition of water insoluble solvent
3. Low temperature The purpose of the water soluble salt in the aqueous phase is merely to reduce the solubility of the unsaturated carboxylic acid in the aqueous phase. By inert we mean a salt which does not enter into the chemical reaction.

Suitable water soluble inert salts are for example the chlorides of the alkaline earth metals and alkali metals, typically sodium chloride, calcium chloride or magnesium chloride. Calcium chloride is particularly suitable as it is relatively cheap and has a high solubility in the aqueous phase. Other suitable water soluble inert salts will be obvious to those skilled in the art.

The concentration of salt in the aqueous phase should be as high as possible to decrease as much as possible the solubility of the carboxylic acid in the aqueous phase.

Using calcium chloride, we have found that the preferred concentration of inert salt is above 20% w/v, below 20% w/v a certain amount of agglomeration does occur although less than when no inert salt is present. At low concentration of inert salts (say below 25% w/v) it is beneficial to lower the concentration of dissolved unsaturated carboxylic acid by lowering the temperature of the reaction and/or by adding a water insoluble solvent to increase the partition coefficient of acid in the organic phase.

The nature of the suspending agent is not narrowly critical except that the agent should be soluble in the aqueous phase and not be salted out of solution by the inert salt. Conventional suspending agents used in normal suspension polymerisation reactions which have the required solubility may be used in the process of our invention. Thus, for example, with calcium chloride or magnesium chloride a suitable suspending agent is polyvinylalcohol but the well known suspending agent methyl cellulose is unsatisfactory with calcium chloride or magnesium chloride as it is insoluble in the aqueous phase.

The amount of suspending agent used in our invention must be sufficient to stabilise the suspension of droplets. Suitable amounts will be obvious to those skilled in the art. For example suitable concentrations of PVA in the aqueous phase are in the range from 0.1% to 10% w/v preferably 0.5% to 2% w/v.

Suitable crosslinking agents contain two or more olefinically unsaturated bonds and preferably are insoluble in the aqueous phase but soluble in the organic phase. Suitable crosslinking agents are for example polyvinyl aromatic compounds such as divinyl benzene, divinyl toluene, divinyl xylene, divinyl chlorobenzene, divinyl naphthalene, divinyl ethylbenzene and trivinyl benzene. The crosslinking agents may also be selected from compounds in which at least two polymerisable bonds exist in an aliphatic molecule. Examples of these are butadiene, isoprene, dimethallyl, diethallyl, diallyl, cyclopentadiene, piperylene, chloroprene, 2,3-dimethyl-3-butadiene, 2,3-pentadiene, 1,4-pentadiene, 1,5-hexadiene, 2,4-hexadiene, 2,5-dimethyl-2,4-hexadiene, octadiene, 3,7-dimethyl-2,4-octadiene, 2-methyl-6-methylene-2,7-octadiene, 1,3-decadiene, 1,3,5-hexatriene, hexachlorocyclopentadiene, dicyclopentadiene and divinyl ether. The amount of crosslinking agent to be added is not critical and suitable amounts will be obvious to those skilled in the art, to produce a strong water insoluble polymer bead. In general, the amount of crosslinking agent will be in the range of 1% to 10% w/w of acid monomer, depending on the properties required.

The organic phase may consist solely of a mixture of monomers and initiators but may also contain an organic solvent. We have found that the presence of suitable solvent in the organic phase reduces agglomeration of the product beads in those cases where the amount of inert salt present in the aqueous phase is insufficient to suppress effectively the solubility of the carboxylic acid in the aqueous phase. The solubility of the carboxylic acid in the aqueous phase is considered effectively suppressed if the product is in the form of substantially unagglomerated beads.

Suitable solvents should be substantially insoluble in the aqueous phase and include for example diethyl ether, benzene, toluene and aliphatic hydrocarbons having six or more carbon atoms such as hexane or heptane.

The product formed by the process of our invention is in the form of approximately spherical beads of substantially the same size as the size of the droplets of organic phase in the reaction mixture. The size of the product may therefore be controlled by adjusting the size of the suspending droplets. The droplet size may be controlled for example by means of controlled agitation in a high shear mixer e.g. in a "Silverson" mixer before polymerisation. Preferably for use in the "Sirotherm" process the product size is between 0.4 and 2 microns.

Reactions catalysed with peroxide initiators are normally carried out at about 60°–80°C.

We have found that if the process of our invention is carried out at these temperatures that the product is agglomerated due probably either to breakdown of the action of the suspending agent or to increase in solubility of the acid in the aqueous phase. The reaction of our invention may be carried out between 0°C and 50°C preferably between 5°C and 40°C.

The relative amounts of organic and aqueous phase is not narrowly critical. Sufficient aqueous phase should, however, be present to allow easy stirring and manipulation of the liquid and also to act as a heat sink for the heat of polymerisation of the reaction. The upper limit of amount of aqueous phase is governed by the cost of manipulating large volumes of liquids. Suitable proportions of organic and aqueous phases will be obvious to those skilled in the art.

The invention will now be illustrated but by no means limited to the following examples.

EXAMPLE 1

This Example illustrates the effect of using the special redox system in the absence of any inert salt and is therefore a comparative example.

An organic phase comprising methacrylic acid (86.1 g; 1 mole), divinyl benzene (0.025 moles), lauryl peroxide (2.5 g) and toluene (50 mls) was mixed with an aqueous phase comprising an aqueous solution of 1% poly vinyl alcohol in (400 mls) 0.5% "Teric 12A8 carboxylated" ("Teric 12A8 carboxylated" is a Registered Trade Mark for a concentrate of 8 mls of ethylene oxide condensed onto an alcohol having 12 carbon atoms and a carboxyl group).

The mixture was passed through a "Silverson" ("Silverson" is a Registered Trade Mark for a mixer) mixer to give a suspension of droplets of organic phase from 1 to 2 microns in diameter suspended in the aqueous phase.

A solution of 3 g ferrous chloride in 15 mls water was added dropwise to the stirred mixture over 20 minutes. The temperature of the solution rose from 23.2°C to 30.2°C. After 20 minutes the polymer produced was obtained as primary particles each about 1 micron in diameter. The primary particles were partially aggregated into small agglomerates which could not be completely dispersed by stirring at pH 12.

EXAMPLE 2

This example illustrates the effect of adding inert salt. An organic phase comprising methacrylic acid (80.2 mls), divinyl benzene (5 mls), lauryl peroxide (3 g) and toluene (50 mls) was mixed with an aqueous phase comprising 300 mls of 1% aqueous poly vinyl alcohol and 150 g of $CaCl_2.6H_2O$ (18% w/w $CaCl_2$).

The mixture was passed through a "Silverson" mixer and suspended as droplets of organic phase 2–4 microns in diameter. A solution of 3 g ferrous chloride in 12 ml of water was added dropwise over 14 minutes. The temperature rose from 26.1°C initially to 45°C at the end of the additions.

The product comprised primary particles in the size range 1 to 5 microns diameter. The primary particles were in the form of small agglomerates of from 2–5 primary particles. The amount of aggregation was less than in Example 1. The yield of crosslinked polymer was 90.5% based on methacrylic acid. The polymer was suitable for use in the "Sirotherm" process.

EXAMPLE 3

Examples 3 and 4 illustrate the deleterious affect of reduction of solvent when using 18% w/v calcium chloride solution.

An organic phase comprising methacrylic acid (85.5 g) divinyl benzene (5 mls) lauryl peroxide (3 g) and toluene) (17 ml) was mixed with an aqueous phase comprising 350 mls of aqueous 1% solution of polyvinyl alcohol and 70 g of anhydrous calcium chloride (18% w/v of aqueous phase). The mixture was degassed for 10 minutes with nitrogen and passed through a "Silverson" mixer to give a suspension of droplets of organic phase the bulk of which was about 1 micron in diameter although there was a minor proportion of droplets up to 5–10 microns in diameter.

A solution of ferrous chloride (3 g in 16 g water) was added dropwise over 17 minutes. The temperature was initially 29°C and rose to 49°C.

The product comprised primary particles aggregated into large agglomerates about 30 microns in diameter. These agglomerates were smaller than in Example 1 but larger than the agglomerates in Example 2.

EXAMPLE 4

Example 2 was repeated except that the toluene was omitted. The product comprised 1 micron primary particles aggregated into large agglomerates about 100 microns in diameter. The agglomerates could not be dispersed.

EXAMPLE 5

This Example illustrates the effect of having a higher aqueous phase: organic phase ratio, and of lowering the initial temperature in the absence of toluene.

An organic phase comprising methacrylic acid (86.5 g) divinyl benzene (5 ml) and lauryl peroxide (3 g) was mixed with an aqueous phase comprising 500 ml of 1% aqueous polyvinyl alcohol solvent and 100 g of anhydrous calcium chloride.

The mixture was passed through a "Silverson" mixer and the resulting suspension was cooled to 12°C prior to reaction. An aqueous solution of 3 g ferrous chloride in 15 ml water was added dropwise to the mixture with stirring. The temperature rose from 12°C to 30°C. The mixture was stirred for a further three hours, centrifuged. The product was stirred with one liter of water mixed with 100 mls of a 50% w/w caustic soda and appeared to be almost completely unagglomerated. The primary particles were about 1 micron in diameter.

EXAMPLE 6

Example 5 was repeated exactly except that the of inert salt was increased from 100 g $CaCl_2$ to 175 g $CaCl_2$ (35% w/v of aqueous phase).

The product was completely dispersed at the end of the reaction. The polymer in aqueous suspension was completely dispersed as substantially spherical spheres from 0.5 to 2 microns in diameter above pH 7 but at pH below 5 the polymer formed light aggregates. These aggregates dispersed completely of change of pH to above 7. The yield of crosslinked polymer was 90.2%.

EXAMPLE 7

Example 6 was repeated exactly except that the solution was not cooled prior to reaction. The temperature of the mixture was initially 24°C and raised to 33°C. The product after washing was in the form of completely dispersed particles 0.5 – 2 $\mu$ yield 91%.

EXAMPLE 8

Example 6 was repeated exactly except that the ratio of organic phase to aqueous phase was increased by replacing the aqueous phase comprising 500 mls of 1% polyvinyl alcohol and 175 g of calcium chloride (35 w/v aqueous phase) with 350 mls of 1% polyvinyl alcohol and 122 g of calcium chloride (35 w/v aqueous phase).

The reaction mixture was initially cooled to 9°C. During polymerisation, the temperature rose to 28°C. The product was obtained as completely dispersed spherical particles of 0.5 to 3 $\mu$.

EXAMPLE 9

Example 6 was repeated exactly, except that lauroyl peroxide was replaced by 3g dicumyl peroxide. The polymer product was completely dispersed as fine 0.5 to 2 micron spheres obtained in high yield.

EXAMPLE 10

Example 9 was repeated exactly, except that dicumyl peroxide was replaced by 3g di-cetyl peroxy dicarbonate. The polymer product was completely dispersed as fine 0.5 to 2 micron spheres and obtained in high yield.

EXAMPLE 11

Example 6 was repeated exactly, except that ferrous chloride was replaced by 3g titanous chloride. The polymer product was completely dispersed as fine 0.5 to 2 micron spheres and obtained in high yield.

EXAMPLE 12

This Example illustrates the need for a substantially water insoluble first part of the redox system. Tertiary butyl hydroperoxide has a partition coefficient between the organic and aqueous phases of about 12:1 and is unsuitable for use in the process. This example is therefore comparative.

Example 6 was repeated exactly, except that lauroyl peroxide was replaced by 1g tertiary butyl hydroperoxide. The mixed phases were passed through a "Silverson" mixer to give a suspension of droplets of organic phase of 1–2 micron in the aqueous phase.

On addition, the ferrous chloride immediately turned brown indicating instant oxidation, the temperature of the reaction mixture increased from 10°C to 17°C in less than one minute after which no further heat output was noticed. The product was observed to be large (100 micron) agglomerates of primary particles less than 0.5 micron. After washing free of calcium chloride, but still in an acid environment, the agglomerates appeared to be unaltered. Basification to pH 13 with 1 N. sodium hydroxide solution dissolved the bulk of the solid leaving a smaller amount of agglomerated solid in suspension.

EXAMPLE 13

Illustrates higher temperature thermal initiation. A suspension of monomer phase in calcium chloride solution was prepared as in example 6. Instead of adding ferrous chloride solution to cause polymerisation initiation, the suspension was heated to 65°C and held for 70 minutes when the temperature started to rise to a high of 80°C. After cooling to 20°C, the solid was examined and found to be in very large agglomerates of particles. Washing and basification did not break up the agglomerates. This example is comprehensive.

EXAMPLE 14

Example 6 was repeated exactly except that instead of adding 100 g anhydrous calcium chloride to the aqueous phase, 150 g of magnesium chloride was added. The polymerisation occurred normally and product of similar quality was obtained in high yield.

EXAMPLE 15

This example illustrates the change in solubility in methacrylic acid in the aqueous phase with change in amount of inert salt and organic solvent.

Solutions of calcium chloride of various concentrations (100 g) were shaken with excess methacrylic acid and the aqueous phases titrated with 1.00 N NaOH, giving the following results at 25°C.

| CaCl₂ Conc (wt %) | Solubility of MAA (% w/w) |
|---|---|
| 5 | 9.25 |
| 10 | 5.48 |
| 15 | 3.28 |
| 20 | 2.18 |
| 30 | 0.99 |

Repeated for system 70% MAA 30% toluene (v/v)/CaCl₂ solution

| CaCl₂ Conc (wt %) | Solubility of MAA in aqueous phase (% w/w) |
|---|---|
| 5 | 5.8 |
| 10 | 3.66 |
| 15 | 2.50 |
| 20 | 1.63 |
| 30 | 0.72 |

We claim:

1. A process of manufacturing approximately spherical polymeric beads of average size less than 20 microns, which process comprises copolymerising an unsaturated carboxylic acid and a crosslinking agent characterised in that the polymerisation is initiated by means of a two part redox free radical system and is carried out in a reaction mixture comprising a fine suspension of droplets of an organic phase in an aqueous phase wherein the organic phase comprises an acid chosen from the group consisting of methacrylic acid and crotonic acid; a crosslinking agent chosen from the group consisting of divinyl benzene, divinyl toluene, divinyl xylene, divinyl chlorobenzene, divinyl naphthalene, divinyl ethylbenzene and trivinyl benzene, butadiene, isoprene, dimethallyl, diethallyl, diallyl, cyclopentadiene, piperylene, chloroprene, 2,3-dimethyl-3-butadiene, 2,3-pentadiene, 1,4-pentadiene, 1,5-hexadiene, 2,4-hexadiene, 2,5-dimethyl-2,4-hexadiene, octadiene, 3,7-dimethyl-2,4-octadiene, 2-methyl-6-methylene-2,7-octadiene, 1,3-decadiene, 1,3,5-hexatriene, hexachlorocyclopentadiene, dicyclopentadiene and divinyl-ether, and an oil soluble and water insoluble first organic oxidant part of a redox free radical initiator system; and wherein the aqueous phase comprises a solution of water, at least 15% weight inert salt per volume aqueous phase and a suspending agent which is soluble in water and not salted out of solution by said inert salt; and the second inorganic reductant part of the redox free radical initiator is at least partially soluble in both the organic and the aqueous phase and is added to the reaction mixture during the course of polymerisation while the mixture is maintained at a temperature in the range from 0°C to 50°C.

2. A process according to claim 1 wherein the acid is methacrylic acid.

3. A process according to claim 1 wherein the first part of the redox system is chosen from the group consisting of lauroyl peroxide, isobutyryl peroxide, di-cetyl peroxydicarbonate, cumene hydro peroxide, di-cumyl peroxide, benzyl peroxide and t-butyl peroxy pivalate, and the second part of the redox system is chosen from the group consisting of $Fe^{++}$, $Ti^{+++}$, and $Co^{++}$.

4. A process according to claim 1 wherein the inert salt is calcium chloride or magnesium chloride.

5. A process according to claim 4 wherein the concentration of inert salt in the aqueous phase is above 20% w/v.

6. A process according to claim 1 wherein the suspending agent is from 0.1% to 10% weight of polyvinyl alcohol per volume of aqueous phase.

7. A process according to claim 6 wherein the concentration of polyvinyl alcohol in the aqueous phase is from 0.5% to 2% w/v.

8. A process according to claim 1 wherein the concentration of inert salt is between 15 and 25% w/v and wherein the organic phase comprises a substantially water insoluble organic solvent.

9. A process according to claim 8 wherein the organic solvent is chosen from the group consisting of diethyl ether, benzene, toluene and aliphatic hydrocarbons having six or more carbon atoms.

10. A process according to claim 1 wherein the reaction is carried out at a temperature in the range from 5° to 40°C.

11. A process according to claim 1 wherein the particles have an average size in the range from 0.4 to 2 microns.

* * * * *